United States Patent Office 3,759,718
Patented Sept. 18, 1973

3,759,718
PROCESS FOR PREPARATION OF IKURA (SALMON EGG)
Takashi Sugihara, Kashiwa, Chiyoshi Yashima and Hideo Tamura, Tokyo, Mitsuyasu Kawasaki, Niiza, and Shogo Shimizu, Tokyo, Japan, assignors to Riken Vitamin Oil Co., Ltd., Tokyo, Japan
No Drawing. Filed Feb. 8, 1971, Ser. No. 113,683
Claims priority, application Japan, Dec. 30, 1970, 46/122,091
Int. Cl. A23l *1/325*
U.S. Cl. 426—47                                          8 Claims

ABSTRACT OF THE DISCLOSURE

Process for preparation of "ikura" characterized in separating the granular eggs of salmon and trout through the action of protease to decompose the supporting tissue as well as the ovary membrane of said eggs.

---

The present invention relates to process for easy and economical preparation of "ikura" (salmon roe), and more particularly for obtaining separated granular eggs with high yield in a short time through the action of protease at the separation process of granular eggs of salmon and trout.

Hitherto known processes for obtaining separated granular eggs comprise the rapid washing off in fresh water or salt water, the mass of blood and other filth from the egg from the ovary of salmon and trout. The washing is carried out on the cotton net which is woven in the form of a checkered mesh. The washed eggs are then taken from the water or salt water in order to separate the single granular eggs by the use of physical pressure. In the publicly known processes disclosed in the following literature, for example, Suisan Meisanhin Soran (General Handbook of Special Marine Products) on page 13 (published by Korin Shoin in 1968) and Suisan Kako-Kaku (Technology of Processing for Marine Products) on page 119 (published by Kosei-Sha and Kosei-Kaku in 1963), it is necessary for each of the granular eggs to resist the physical pressure applied to it and it is thus necessary to select properly matured eggs so that, as a rule, only fresh granules obtained within 6 hours after a haul can be used for preparing "ikura."

Because of these limitations, the location of a production factory has hitherto been a problem, and long experience and skill has been required to obtain separated granular eggs with high yield.

The present invention lies in an improvement for overcoming the foregoing drawbacks and relates to a process for preparing "ikura" by treating the granular eggs of salmon and trout with protease at the separation step.

The eggs of salmon and trout consist of the ovary, eggs granules and the membraneous tissue (which is hereinafter called the supporting tissue) enveloping individual granular eggs which are supported in said ovary. The present inventors have taken notice of the difference among said ovary membrane, the membrane of granular eggs and the supporting tissue in their reaction to protease. After various experiments and studies, it has been found that the supporting tissue is quickly decomposed, subsequently the ovary membrane is also decomposed while the membrane of granular eggs remain unspoiled, and thus individual granules are separated.

The present invention relates to a process for preparation of "ikura" wherein said process is characterized in that the granular eggs are taken out of the ovary of salmon and trout, then the mass of blood and other filth is quickly washed therefrom in fresh water or salt water. Subsequently said washed eggs are taken from the water and steeped and agitated in a protease solution in order to decompose the supporting tissue and ovary membrane. The thus obtained granular separated eggs are salted by a known process.

According to the present invention, any protease may be used, for example, alkaline protease, neutral protease and acid protease.

Furthermore, according to the present invention the enzyme solution is prepared by dissolving said protease in fresh water or a solution of salt water having a concentration up to saturation, and preferably in the range from 2–10%. Moreover said solution may be adjusted, depending on the property of the enzyme, to a pH of 3–10 by adding a buffering agent.

The temperature of the enzyme solution is desirably in the range less than 70° C. which corresponds to the coagulation temperature of the protein contained in eggs of salmon and trout and more than 15° C. for effective enzyme action, as well as maintaining the flavor and taste of the "ikura." The treating time in the protease solution varies from 2–60 minutes depending on the activity of enzyme added, and the temperature of the enzyme solution.

According to the present invention, as is mentioned above, separated eggs can be obtained with high yield in a short time without applying any physical pressure; much less care is required insofar as the freshness and maturity of the eggs are concerned and long experience and skill is not required as compared with the conventional processes.

Furthermore according to the present invention, the production yield is more than 85%, while it is 50 to 60% in the conventional processes.

The present invention will now be explained with reference to examples as follows:

EXAMPLE I

Eggs of silver salmon of 1 kg. weight are quickly washed to remove blood and filth in fresh water. Subsequently, said washed eggs are soaked in an enzyme solution (pH 6.6) prepared by dissolving 300 g. of common salt and 5 g. of neutral protease (protease being on the market, Godo-BNP, trademark, 100 p.u./mg.) in 10 kg. water. The solution is kept at a temperature of 38–40° C. and after agitation for 5 minutes, the separated granular eggs are scooped up in a net, and then cooled as well as washed in a large amount of solution containing 3% sodium chloride which is kept at a temperature of 15° C. After being steeped in a saturated solution of salt for 15 minutes, said treated eggs are left on the wire net frame for two hours in order to remove water, the ovary and other filthy residue which remain. Then the surface of the granular eggs are coated with pure vegetable oils (quantity of oil to be coated is 2% of eggs by weight) whereby 852 g. of the product (so called "ikura"), are obtained (the yield of the product is 85.2%). There is no difference in the color, flavor and taste between the product obtained according to the present invention and those made according to conventional processes.

EXAMPLE II

Eggs of pink salmon of 1 kg. weight are quickly washed in fresh sea water to remove blood and filth. Subsequently, said washed eggs are soaked in an enzyme solution (pH 4.0) prepared by dissolving 300 g. of common salts and 4 g. of acid protease (Molsin, trademark, 100 p.u./mg.) in 10 kg. of water, said enzyme solution being kept at a temperature of 20–25° C. After agitation for 20 minutes, the separated granular eggs are scooped up with a net and then cooled as well as washed in a large amount of a solution of salt containing 3% of sodium chloride which is kept at a temperature of 15° C. The granular eggs are then treated in a manner similar to that in Example I, whereby 858 g. of the product ("ikura") are obtained (the yield rate of the product is 85.8%).

EXAMPLE III

Eggs of dog salmon of 1 kg. weight, which are preserved for 30 hours at a temperature of 5–6° C. after being taken out from the ovary are soaked in an enzyme solution (pH 8.0) previously prepared by dissolving 1,000 g. of common salt and 25 g. of alkaline protease (protease being on the market, "Prozyme Kyowa" trademark, 100 p.u./mg.) in 10 kg. water, said enzyme solution being kept at a temperature of 50–55° C. After agitation for 5 minutes, the separated granular eggs are scooped up with a net, and then cooled as well as washed in a large quantity of a solution of salt containing 1% sodium chloride which is kept at a temperature of 12° C. After being steeped for 15 minutes in a saturated solution of salt containing 150 p.p.m. sodium nitrite, said eggs are treated to remove water therefrom, and selected and coated with vegetable oils in a manner similar to that in Examples I and II, whereby 850 g. of the product ("ikura") are obtained (the yield rate of the product is 85.0%).

What is claimed is:

1. A process for preparing salmon and trout eggs by separating the granular eggs of salmon and trout from the supporting tissue and ovary membrane by treating with protease to decompose the supporting tissue and the ovary membrane of the eggs.

2. Process according to claim 1 wherein said protease is selected from the group consisting of acid protease, neutral protease and alkaline protease.

3. The process of claim 1 wherein the protease is in a solution with fresh water or 2–10% salt water, the pH of the solution being from 3 to 10.

4. The process of claim 1 wherein the treatment is carried out at a temperature in the range from 15° to 70° C.

5. The process of claim 1 wherein the treatment is carried out for a time from 2 to 60 minutes.

6. The process of claim 1 wherein the granular eggs are previously cleaned in a solution of salt or water to remove filth and blood therefrom before the treatment with the protease.

7. The process of claim 1, which further comprises washing the granular eggs in a diluted solution of salt, preserving the eggs in a saturated solution of salt, cooling the eggs and then removing the water therefrom and coating the surface of the granular eggs with vegetable oil.

8. Process according to claim 7 wherein said treated granular eggs are preesrved in salt instead of a saturated solution of salt.

References Cited

UNITED STATES PATENTS 7,895   1/1851   Westacott _____ 99—111

A. LOUIS MONACELL, Primary Examiner

R. M. ELLIOTT, Assistant Examiner

U.S. Cl. X.R.

426—302, 376, 92, 7